United States Patent
O'Sullivan et al.

(10) Patent No.: US 9,536,230 B2
(45) Date of Patent: Jan. 3, 2017

(54) MANAGING CALENDARING EVENTS

(75) Inventors: Patrick Joseph O'Sullivan, Ballsbridge (IE); Liam Harpur, Skerries (IE); Fred Raguillat, Dunboyne (IE); Carol Sue Zimmet, Boxborough, MA (US)

(73) Assignee: International Business Machines Corporation, Armonk, NY (US)

( * ) Notice: Subject to any disclaimer, the term of this patent is extended or adjusted under 35 U.S.C. 154(b) by 693 days.

(21) Appl. No.: 12/346,045

(22) Filed: Dec. 30, 2008

(65) Prior Publication Data
US 2010/0169145 A1    Jul. 1, 2010

(51) Int. Cl.
*G06F 15/16*    (2006.01)
*G06Q 10/10*    (2012.01)
*G06Q 50/00*    (2012.01)

(52) U.S. Cl.
CPC ........ *G06Q 10/109* (2013.01); *G06Q 10/1095* (2013.01); *G06Q 50/01* (2013.01)

(58) Field of Classification Search
CPC .................................................. G06Q 10/109
USPC ........................................ 709/205, 206, 207
See application file for complete search history.

(56) References Cited

U.S. PATENT DOCUMENTS

| | | | |
|---|---|---|---|
| 4,745,599 A | 5/1988 | Raychaudhuri | |
| 4,774,707 A | 9/1988 | Raychaudhuri | |
| 5,166,545 A | 11/1992 | Harrington | |
| 5,241,542 A | 8/1993 | Natarajan et al. | |
| 5,280,518 A | 1/1994 | Danler et al. | |
| 5,583,450 A | 12/1996 | Trimberger et al. | |
| 5,677,997 A | 10/1997 | Talatik | |
| 5,818,815 A | 10/1998 | Carpentier et al. | |
| 5,842,173 A | 11/1998 | Strum et al. | |
| 5,864,851 A | 1/1999 | Breitbart et al. | |
| 5,873,094 A | 2/1999 | Talatik | |
| 5,915,115 A | 6/1999 | Talati | |
| 5,938,721 A | 8/1999 | Dussell et al. | |
| 5,999,931 A | 12/1999 | Breitbart et al. | |
| 5,999,942 A | 12/1999 | Talati | |
| 6,018,528 A | 1/2000 | Gitlin et al. | |
| 6,047,288 A * | 4/2000 | Kurosawa et al. | |
| 6,064,662 A | 5/2000 | Gitlin et al. | |
| 6,125,282 A | 9/2000 | Urabe | |
| 6,137,793 A | 10/2000 | Gorman et al. | |
| 6,343,299 B1 | 1/2002 | Huang et al. | |
| 6,618,723 B1 * | 9/2003 | Smith | |
| 6,781,920 B2 * | 8/2004 | Bates et al. | 368/10 |
| 6,889,333 B2 | 5/2005 | Lawrence et al. | |
| 6,931,419 B1 | 8/2005 | Lindquist | |

(Continued)

OTHER PUBLICATIONS

Newbold et al., "A model for CIO-led innovation", IBM Systems Journal, vol. 46, No. 4, Sep. 25, 2007 (G321-0167-00), p. 633.*

(Continued)

*Primary Examiner* — Karen Tang
(74) *Attorney, Agent, or Firm* — Brian J. Colandreo, Esq.; Jeffrey T. Placker, Esq.; Holland & Knight LLP (57) ABSTRACT

An indication of a meeting being scheduled between a plurality of attendees is received. A first one of the attendees is designated an owner of the meeting. Ownership privileges for the meeting are associated with at least a second one of the meeting attendees. The ownership privileges associated with at least a second one of the meeting attendees are associated based upon, at least in part, a social network defined for the owner of the meeting.

19 Claims, 6 Drawing Sheets

(56) References Cited

U.S. PATENT DOCUMENTS

| | | | |
|---|---|---|---|
| 7,219,107 B2 | 5/2007 | Beringer | |
| 8,805,450 B2* | 8/2014 | Wen et al. | 455/566 |
| 2004/0059587 A1* | 3/2004 | Astle et al. | 705/1 |
| 2005/0273510 A1* | 12/2005 | Schuh | 709/225 |
| 2006/0045029 A1* | 3/2006 | Ethier et al. | 370/260 |
| 2007/0106725 A1* | 5/2007 | Starr et al. | 709/204 |
| 2007/0174104 A1* | 7/2007 | O'Sullivan | G06Q 10/06311 705/7.21 |
| 2007/0255721 A1* | 11/2007 | Chess et al. | 707/10 |
| 2008/0294999 A1* | 11/2008 | Bank et al. | 715/751 |
| 2009/0006608 A1* | 1/2009 | Gupta | G06Q 10/10 709/224 |
| 2009/0171734 A1* | 7/2009 | Callanan | G06Q 10/06311 705/7.13 |
| 2012/0191777 A1* | 7/2012 | Iwasaki | G06Q 10/10 709/204 |

OTHER PUBLICATIONS

Anderson, "Collaboration and Knowledge Transfer Tools for the 24 Hour Knowledge Factory", University of Arizona, Apr. 24, 2008, accessed Aug. 29, 2011 at <https://next.eller.arizona.edu/courses/24hourKnowledgefactory/Spring2008/final_papers/DAnderson_DianaAnderson_ENTR415.pdf>, p. 10.*

\* cited by examiner

MANAGING CALENDARING EVENTS

TECHNICAL FIELD

This disclosure relates to meeting management, and, more particularly, to the provision of meeting management privileges to meeting attendees based upon a social network of a meeting owner.

BACKGROUND OF THE INVENTION

Today, technology exists that allows a member of an organization to send meeting invites to other members of the organization so that meetings may be scheduled to e.g., discuss various topics of interest within the group of attendees. These meetings may be in person meetings or may be virtual meetings that occur through instant messaging systems, phone systems, video conference systems, electronic whiteboard systems, or any combination thereof.

Typically, an owner is designated for each meeting (often the individual that initially scheduled the meeting). The meeting owner may have specific management rights/obligations that the other attendees of the meeting do not have. Unfortunately, in the event that the assigned owner does not live up to the obligations, or is unable to perform the management functions, difficulties may arise. For example, if the designated owner is out sick the week immediately preceding the meeting and the meeting needs to be rescheduled, as only the designated meeting owner may reschedule the meeting, the meeting may not be rescheduled in the designated meeting owner's absence. Further, if a new member has joined the team and doesn't have the meeting in their calendar, the new team member will have to wait until the designated meeting owner returns before the new member can be added to the meeting attendance list.

BRIEF SUMMARY OF THE INVENTION

In a first implementation, a method includes receiving an indication of a meeting being scheduled between a plurality of attendees. A first one of the attendees is designated an owner of the meeting. Ownership privileges for the meeting are associated with at least a second one of the meeting attendees. The ownership privileges for the meeting are associated with the at least a second one of the meeting attendees based upon, at least in part, a social network defined for the owner of the meeting.

According to a second implementation, a computer program includes a computer readable medium having a plurality of instructions stored on it. When executed by a processor, the instructions cause the processor to perform operations including receiving an indication of a meeting being scheduled between a plurality of attendees. A first one of the attendees is designated an owner of the meeting. The instructions further cause the processor to perform operations including associating ownership privileges for the meeting with at least a second one of the meeting attendees. Ownership privileges for the meeting are associated with the at least a second one of the meeting attendees based upon, at least in part, a social network defined for the owner of the meeting.

According to yet another implementations, a computing system includes at least one processor and at least one memory architecture coupled with the at least one processor. A first software module is executed on the at least one processor and the at least one memory architecture. The first software module is configured to receive an indication of a meeting being scheduled between a plurality of attendees. A first one of the attendees is designated an owner of the meeting. A second software module is executed on the at least one processor and the at least one memory architecture. The second software module is configured to associate ownership privileges for the meeting with at least a second one of the meeting attendees. Ownership privileges for the meeting are associated with the at least a second one of the meeting attendees based upon, at least in part, a social network defined for the owner of the meeting.

The details of one or more implementations are set forth in the accompanying drawings and the description below. Other features and advantages will become apparent from the description, the drawings, and the claims.

DETAILED DESCRIPTION OF THE INVENTION

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
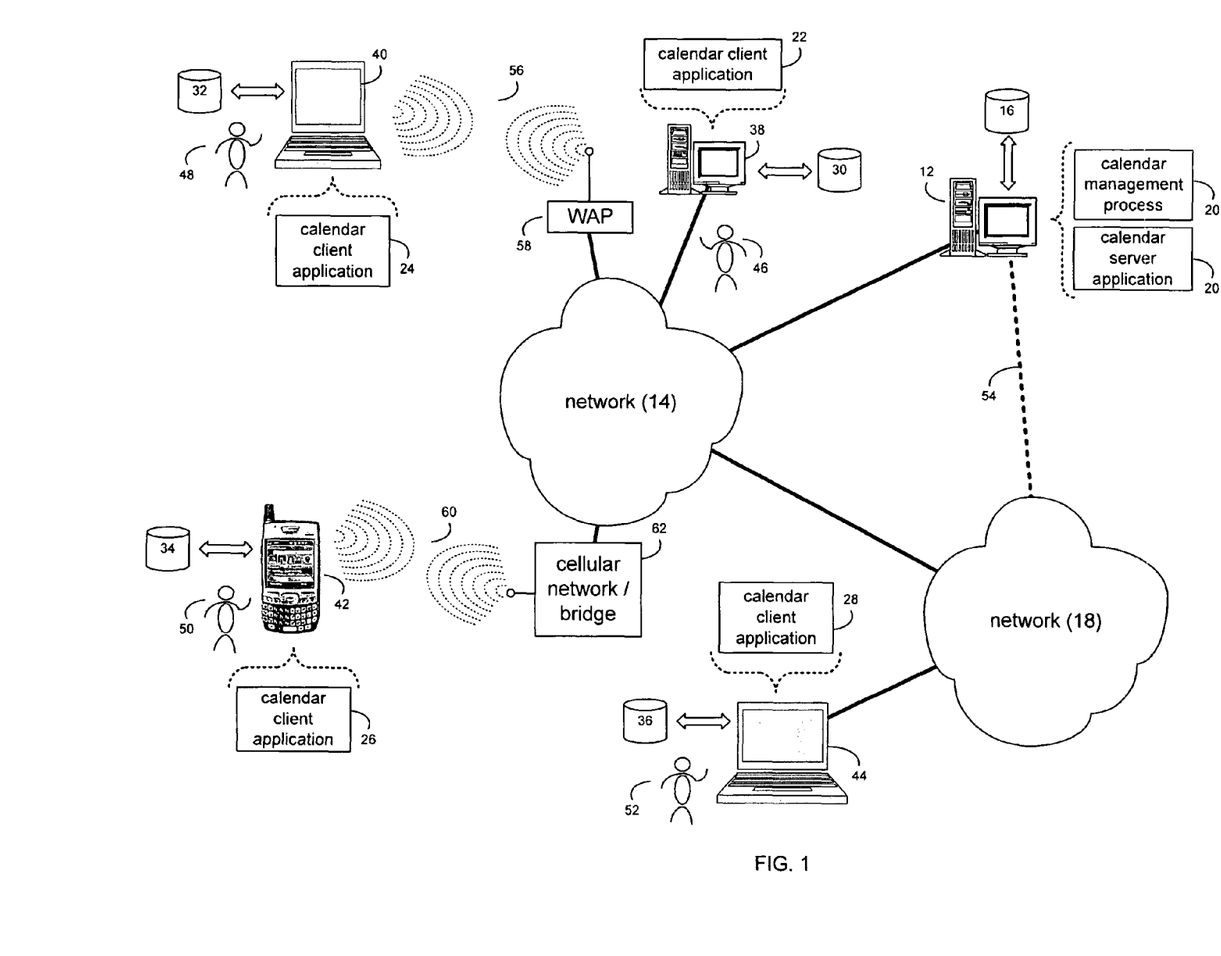
FIG. 1 is a diagrammatic view of a calendar management process, a calendar client application, and a calendar server application coupled to a distributed computing network.

Referring to FIG. 1, there is shown calendar management process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® XP Server; Novell® NetWare®; or Red Hat® Linux®, for example (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both), for example. Alternatively, the calendar management process may reside on and be executed, in whole or in part, by a client electronic device, such as a personal computer, notebook computer, personal digital assistant, or the like.

As will be discussed below in greater detail, calendar management process 10 may receive an indication of a meeting being scheduled between a plurality of attendees. A first one of the attendees may be designated as an owner of the meeting. Ownership privileges for the meeting may be associated with at least a second one of the meeting attendees. The ownership privileges for the meeting may be associated with the at least a second one of the meeting attendees based upon, at least in part, a social network defined for the owner of the meeting.

The instruction sets and subroutines of calendar management process 10, which may include one or more software modules, and which may be stored on storage device 16 coupled to server computer 12, may be executed by one or more processors (not shown) and one or more memory architectures (not shown) incorporated into server computer 12. Storage device 16 may include but is not limited to: a hard disk drive; a solid state drive, a tape drive; an optical drive; a RAID array; a random access memory (RAM); and a read-only memory (ROM).

Server computer 12 may execute a web server application, examples of which may include but are not limited to: Microsoft IIS , Novell Webserver™, or Apache® Webserver, that allows for HTTP (i.e., HyperText Transfer Protocol) access to server computer 12 via network 14 (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; or an intranet, for example.

Server computer 12 may execute calendar server application 20, examples of which may include but are not limited to, e.g., IBM® Lotus® Domino® Server and Microsoft Exchange® Server (IBM, Lotus, and Domino are registered trademarks of International Business Machines Corporation in the United States, other countries or both; Exchange is a registered trademark of Microsoft Corporation in the United States, other countries or both). Calendar server application 20 may be a collaboration software platform that may allow for user collaboration via calendar client applications, e.g., calendar client applications 22, 24, 26, 28, examples of which may include but are not limited to Lotus Notes® and Microsoft Outlook® (Lotus Notes is a registered trademark of International Business machines Corporation in the United States, other countries, or both; and Outlook is a registered trademark of Microsoft Corporation in the United States, other countries, or both). Calendar management process 10 may be a stand alone application that interfaces with calendar server application 20 or an applet/application that is executed within calendar server application 20.

The instruction sets and subroutines of calendar server application 20, which may be stored on storage device 16 coupled to server computer 12 may be executed by one or more processors (not shown) and one or more memory architectures (not shown) incorporated into server computer 12.

In addition/as an alternative to being a server-based application residing on server computer 12, the calendar management process may be a client-side application residing on a storage device (e.g., stored on storage devices 30, 32, 34, 36) coupled to one or more client electronic devices (e.g., client electronic devices 38, 40, 42, 44, respectively). As a client-side application, the calendar management process may, for example, be a stand alone application that may interface with a calendar client application, or may be an applet/application that is executed within a calendar client application. Accordingly, calendar management process may be a server-side process, a client-side process and/or may be a hybrid client-side/server-side process, which may be executed, in whole or in part, by a client electronic device, by a server computer, and/or jointly by a client electronic device and a server computer.

The instruction sets and subroutines of calendar client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; solid state drives, tape drives; optical drives; RAID arrays; random access memories (RAM); read-only memories (ROM), compact flash (CF) storage devices, secure digital (SD) storage devices, and a memory stick storage devices. Examples of client electronic devices 38, 40, 42, 44 may include, but are not limited to, personal computer 38, laptop computer 40, personal digital assistant 42, notebook computer 44, a data-enabled, cellular telephone (not shown), and a dedicated network device (not shown), for example. Using calendar client applications 22, 24, 26, 28, users 46, 48, 50, 52 may access calendar server application 20 and may allow users to e.g., schedule in-person meetings, instant-message based meetings, web-based meetings, telephone conferences, and video conferences, and the like.

Users 46, 48, 50, 52 may access calendar server application 20 directly through the device on which the calendar client application (e.g., calendar client applications 22, 24, 26, 28) is executed, namely client electronic devices 38, 40, 42, 44, for example. Users 46, 48, 50, 52 may access calendar server application 20 directly through network 14 or through secondary network 18. Further, server computer 12 (i.e., the computer that executes calendar server application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows, Microsoft Windows CE®, Red Hat Linux, or a custom operating system (Windows CE is a registered trademark of Microsoft Corporation in the United States, other countries, or both).

Figure 2:
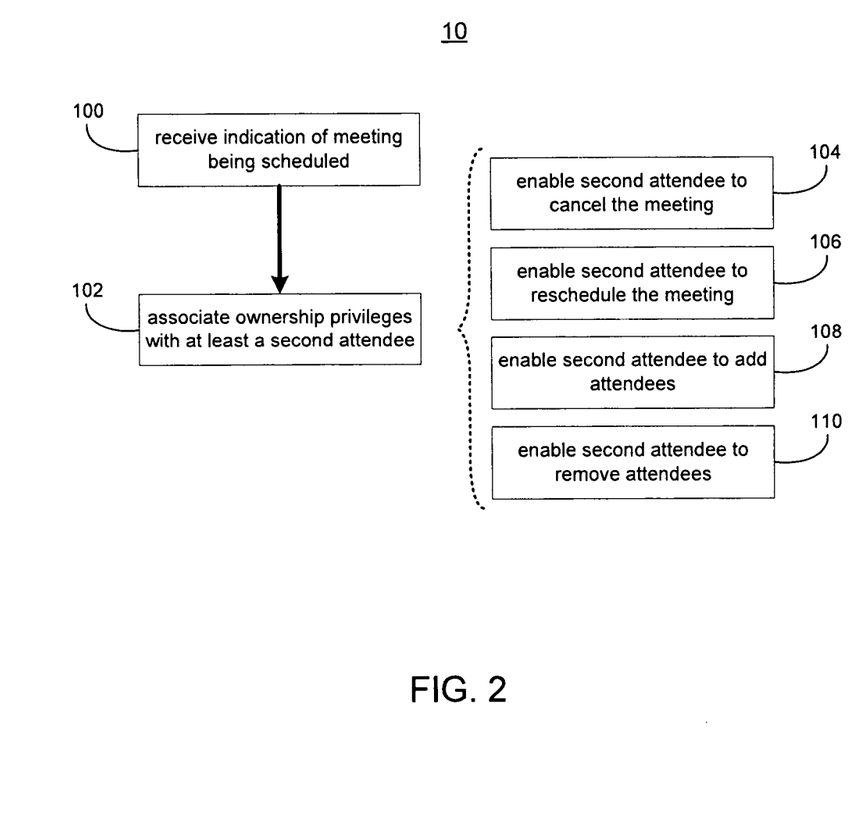
FIG. 2 is a flowchart of the calendar management process of FIG. 1.

Referring to FIG. 2, calendar management process 10 may generally provide a method that may allow ownership privileges for a calendar event (e.g., a meeting) to be delegated to a meeting invitee other than the owner of the meeting. As will be discussed in greater detail below, the method may generally include receiving an indication of a meeting being scheduled (process block 100) between a plurality of attendees. A first one of the attendees may be designated as the owner of the meeting. The method may further include associating ownership privileges for the meeting (in process block 102) with at least a second one of the meeting attendees. Associating ownership privileges with the at least a second one of the meeting attendees, in process block 102, may be based upon, at least in part, a social network defined for the owner of the meeting (i.e., the first one of the attendees).

As stated above, in process block 100, the method may include receiving an indication of a meeting being scheduled between a plurality of attendees. As also discussed previously, the method may be carried out, at least in part, as a server-side process, a client-side process, or a hybrid server-side/client-side process. As such, receiving the indication of the meeting being scheduled, in process block 100, may include a client-side process receiving one or more attributes of the meeting (such as time, date, location, attendees, or the like), which may be input by a first user. Similarly, receiving the indication of the meeting being scheduled, in process block 100, may include a server-side process receiving one or more attributes of the meeting, e.g., from a client calendaring application. Further, receiving the indication of the meeting being scheduled, in process block 100, may include a combination of a client-side and server-side process. The meeting being scheduled may include, for example, an in person meeting, or a virtual meeting, such as an instant messaging-based meeting, a web-based meeting, a telephone conference, a video conference, or the like.

As discussed above, a first one of the attendees (e.g., the attendee scheduling the meeting) may be designated as the owner of the meeting (hereinafter also referred to as "the meeting owner"). For example, the first attendee, as the individual scheduling the meeting, may automatically be designated as the owner of the meeting. As the owner of the meeting, the first attendee may have ownership privileges. Such ownership privileges may include, but are not limited to, the ability to invite attendees to the meeting (including subsequently inviting additional attendees to the meeting), removing (e.g., uninviting) attendees from the meeting, rescheduling the meeting (e.g., for a different time; to a different location; to a different format, such as from an in-person meeting to a telephone conference; etc.), and canceling the meeting. Ownership privileges may include various additional and/or alternative privileges and/or responsibilities.

Ownership privileges for the meeting may be associated (process block 102) with at least a second one of the meeting attendees. Associating ownership privileges with the at least a second one of the meeting attendees, in process block 102, may be based upon, at least in part, a social network defined for the owner of the meeting (e.g., the first one of the attendees). The social network for the meeting owner (i.e., the first attendee) may include those individuals with whom the owner of the meeting interacts (e.g., including, but not limited to, business and social acquaintances, members of the meeting owners department or team, etc.). Such interactions may include, but are not limited to, a history of communications across various communication channels (e.g., email, instant messaging, telephone, and the like), inclusion on the meeting owner's instant messaging buddy list, attendance at the same meetings (e.g., as indicated by commonly scheduled events in respective calendaring applications), working together on the same projects, and so on. Various interactions of the respective email users may be monitored, and a social network defined by, various social networking applications and/or suites, such as, for example IBM Lotus Connections, Microsoft SharePoint®, Facebook®, LinkedIn®, MySpace®, Twitter® (SharePoint is a registered trademark of Microsoft Corporation in the United States, other countries, or both; Facebook is a registered trademark of Facebook, Inc. in the United States, other countries, or both; LinkedIn is a registered trademark of LinkedIn, Ltd. in the United States, other countries, or both; MySpace is a registered trademark of MySpace, Inc., in the United States, other countries, or both; Twitter is a registered trademark of Twitter, Inc. in the United States, other countries or both).

Various policies may be established (e.g., by a system administrator, individual users, or the like) that may, for example, define a threshold levels of proximity of individuals within the meeting owner's social network for the purpose of associating ownership privileges. Proximity of individuals within the meeting owner's social network may be based upon, for example, a frequency of interaction with the meeting owner, the number of different types of interaction with the meeting owner, time since last interaction, and the like. Such policies (e.g., which may include proximity thresholds) may vary depending upon design criteria and user need, and should not be construed as a limitation on the present disclosure.

Associating ownership privileges with at least a second one of the meeting attendees, in process block 102, may allow another meeting attendee to make decisions relative to the meeting and to implement appropriate actions (e.g., exercise ownership privileges) in response to such decisions. Exercising ownership privileges by the at least a second one of the meeting attendees may allow at least some aspects of the meeting to be managed directly by the at least a second one of the meeting attendees directly. As such, the cost (e.g., time, manpower, convenience factor) of communicating the decisions relative to the meeting to the owner of the meeting (e.g., who may then implement action consistent with the decisions) may be reduced and/or avoided.

Ownership privileges for the meeting may be associated with more than one attendee (e.g., a second meeting attendee, a third meeting attendee, etc.) in process block 102, based upon a social network defined for the owner of the meeting (i.e., the first meeting attendee). However, for the ease of explanation the following discussion will relate to ownership privileges being associated with only a second one of the meeting attendees (hereinafter also referred to as "the second meeting attendee"). This, however, should not be construed as a limitation on the present disclosure.

With continued reference to FIG. 2, associating ownership privileges for the meeting with the second meeting attendee, in process block 102, may include enabling the second meeting attendee to cancel the meeting, in process block 104. For example, the second meeting attendee, with whom ownership privileges for the meeting may have been associated, in process block 102, may be a necessary attendee of the meeting. Upon becoming aware that they will not be able to attend the meeting (e.g., and thereby compromising the value of the meeting due to the unavailability of a necessary attendee), the second meeting attendee may cancel the meeting (e.g., via a calendaring client application and/or a calendaring server application). As such, the second meeting attendee may cancel the meeting without necessitating the additional resources (e.g., time, manpower, etc.) of communicating with the owner of the meeting and requesting that the meeting be cancelled.

Further, associating ownership privileges for the meeting with the second meeting attendee, in process block 102, may include enabling the second meeting attendee to reschedule the meeting, in process block 106. Similar to the above-discussed aspect of cancelling the meeting (in process block 104), in the event of the unavailabiltiy of a necessary attendee (or other occurance/situation that may compromise the value of the meeting as originally scheduled), rather than outright cancelling the meeting, the second meeting attendee may reschedule the meeting. Enabling the second meeting attendee to reschedule the meeting, in process block 106, may allow the meeting to be rescheduled without the second meeting attendee having to request the meeting owner rescheduled the meeting, after which the meeting owner must undertake rescheduling the meeting.

Associating ownership privileges with the second meeting attendee, in process block 102, may also include enabling the second meeting attendee to add at least one additional meeting attendee, in process block 108. For example, the second meeting attendee may decide that one or more individuals should attend the meeting, but that the one or more individuals have not been invited to the meeting. As such, the method may enable the second meeting attendee to add the one or more missing individuals to the meeting, in process block 108, which may result in the one or more added individuals being invited to the meeting. For example, a calendaring client application and/or calendaring server application may transmit an invitation for the meeting to the one or more individuals added by the second user.

In a related manner, associating ownership privileges with the second meeting attendee, in process block 102, may further include enabling the second meeting attendee to remove at least one of the plurality of attendees from the meeting, in process block 110. For example, the second meeting attendee may decide that one or more of the plurality of meeting attendees are unnecessary for the meeting (e.g., that their presence at the meeting would not provide value to the meeting, but would needlessly utilize the attendees valuable time). As such, enabling the second meeting attendee to remove at least one of the plurality of attendees from the meeting, in process block 110, may allow the second meeting attendee to unilaterally remove at least one of the plurality of attendees from the meeting, e.g., without having to act through the meeting owner which may, increase the time/manpower necessary to remove the at least one attendee from the meeting.

As discussed herein-above, associating ownership privileges with the second meeting attendee, in process block 102, may include associating full ownership privileges with the second meeting attendee. In other implementations, less than full ownership privilege may be associated with the second meeting attendee in process block 102. For example, associating ownership privileges with the second meeting attendee in process block 102, may include any one or more of enabling the second meeting attendee to cancel the meeting (process block 104), enabling the second meeting attendee to reschedule the meeting (process block 106), enabling the second meeting attendee to add at least one additional attendee to the meeting (process block 108), enabling the second meeting attendee to remove at least one of the plurality of attendees from the meeting (process block 110), and/or any various other privileges that may be granted to the owner of the meeting.

Many individuals may be included within a social network defined for the meeting owner, however, it may not be desirable to associate ownership privileges with every individual included within the social network the meeting owner. Accordingly, the method may include associating ownership privileges with at least a second meeting attendee based upon, at least in part, a social network defined for the owner of the meeting and may be governed by policies, e.g., which may be defined by a system administrator or a user (such as the meeting owner, or other individual).

According to an embodiment, the at least a second one of the meeting attendees (e.g., with whom ownership privileges may be associated in process block 102) may be within a predetermined proximity to the owner of the meeting within the social network defined for the owner of the meeting. For example, as discussed above, various policies may be established, e.g., which may define a threshold level of proximity of individuals within the meeting owner's social network for the purpose of associating owner ship privileges (in process block 102). Such policies may be system wide (e.g., and may be set by an administrator), or may be individually selected for each user or class of user (e.g., and may be set by an administrator or the owner of the meeting).

The proximity of the individuals in the meeting owner's social network to the meeting owner may be based upon various factors and/or considerations. For example, relatively more frequent interaction of an individual with the meeting owner may increase the proximity between the individual and the meeting owner. Similarly, interaction over a relatively greater number of interaction mediums (e.g., email, instant messaging, common usage of a team space, etc.) may increase the proximity between the individual and the meeting owner. The foregoing, and/or other characteristics, may be employed to define ranges of relative proximity between the meeting owner and an individual in the meeting owner's social network. Ownership privileges may be associated with the second meeting attendee (in process block 102) based upon, at least in part, a social network defined for the meeting owner, wherein the second meeting attendee may be within a predetermined proximity to the meeting owner within the social network defined for the meeting owner.

For the following discussion of exemplary implementations, calendar client application 22 is going to be described for illustrative purposes. However, this is not intended to be a limitation of this disclosure, as other calendar client applications (e.g., calendar client applications 24, 26, 28) may be equally utilized.

Figure 3:
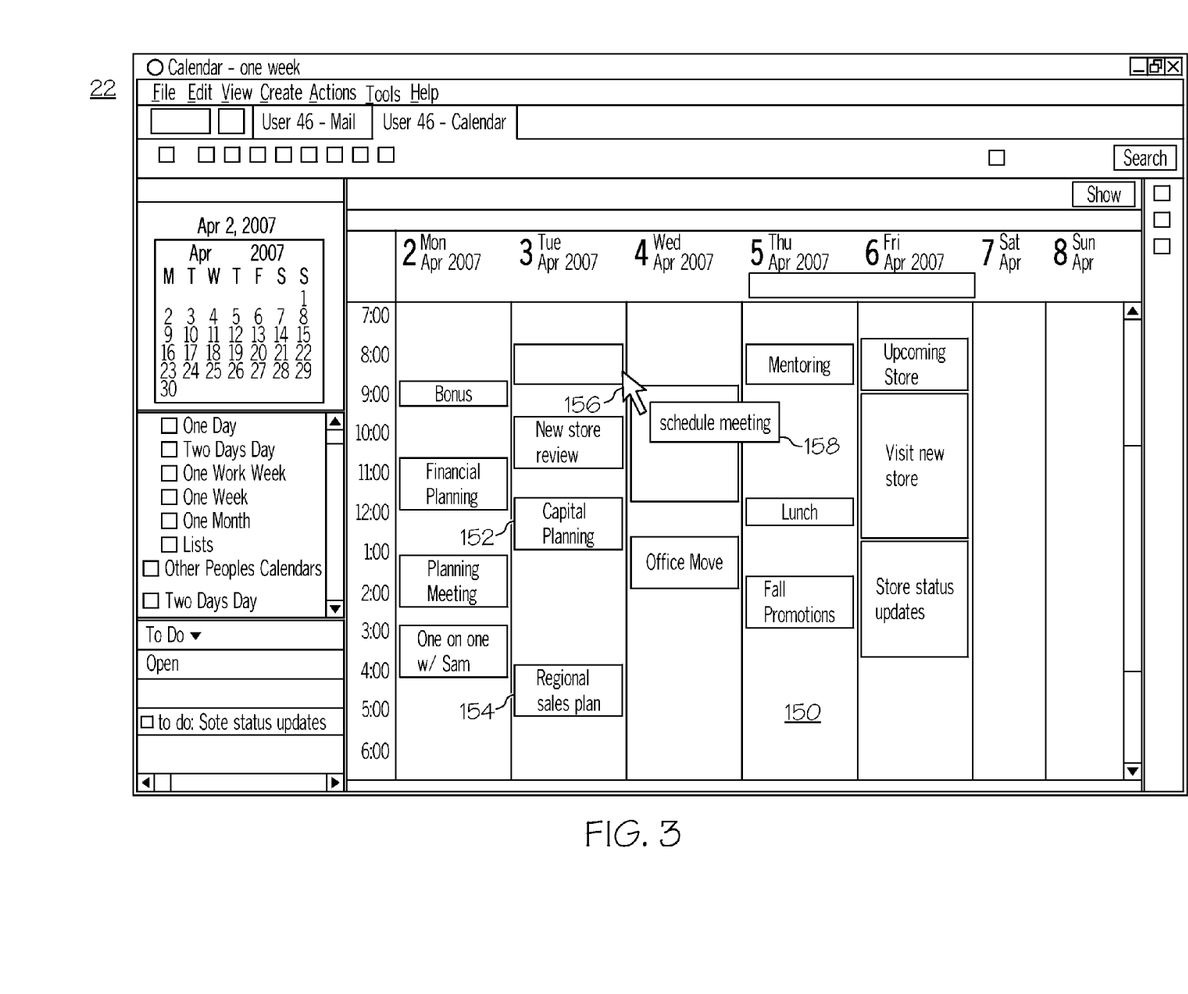
FIG. 3 is a diagrammatic view of a display screen rendered by the calendar client application and/or the calendar server application of FIG. 1.

Referring also to FIG. 3, calendar client application may allow user 46 to schedule meetings through a visual calendaring interface 150. Through visual calendaring interface 150, user 46 may schedule meetings with one or more users (e.g., user 48, user 50, user 52). Accordingly, meeting 152 (which is scheduled from 12:00-1:00 p.m. on Tuesday, 3 Apr. 2007) may be a meeting to which user 46, user 50, and user 52 are scheduled to attend. Further meeting 154 (which is scheduled from 4:15-5:15 p.m. on Tuesday, 3 Apr. 2007) may be a meeting to which user 46, user 48 and user 50 are scheduled to attend.

When scheduling meetings, user 46 may select the time period for which the meeting is to be scheduled. For example, user 46 may select, via on-screen pointer 156 (which may be controlled by a pointing device such as a mouse; not shown), the desired time period (e.g., 8:00-9:00 a.m. on Tuesday, 3 Apr. 2007). Once the desired time period is selected, user 46 may e.g., right-click the pointing device controlling on-screen pointer 156, resulting in calendar server application 20 and/or calendar client application 22 rendering pop-up window 158. While pop-up window 158 is shown to include only one option, namely "schedule meeting", this is for illustrative purposes only and is not intended to be a limitation of this disclosure, as the number of options included within pop-up window 158 may be increased or decreased depending upon the design criteria and user need.

Figure 4:
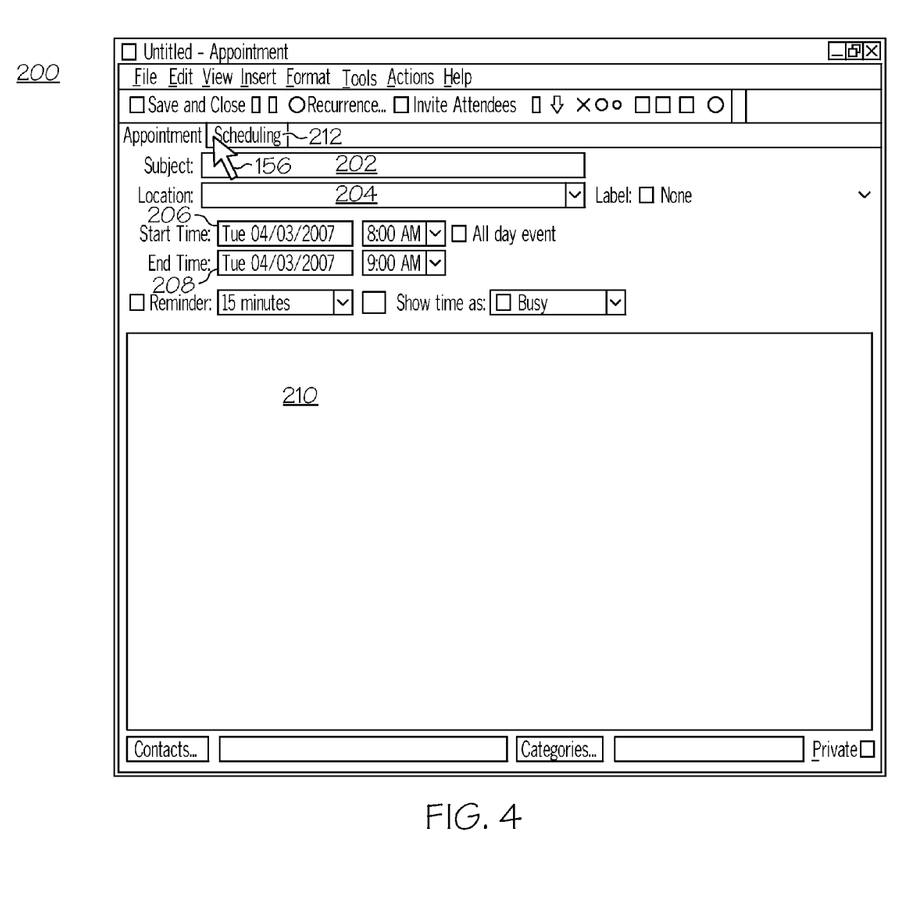
FIG. 4 is a diagrammatic view of a display screen rendered by the calendar client application and/or the calendar server application of FIG. 1.

Referring also to FIG. 4, upon selecting "schedule meeting" from pop-up window 158, calendar server application 20 and/or calendar client application 22 may render meeting window 200. Meeting window 200 may include a plurality of fields such as: subject field 202 (e.g., which may allow user 46 to define the subject of the meeting); location field 204 (e.g., which may allow user 46 to define the location of the meeting); start time field 206 (e.g., which may allow user 46 to define the starting time/date of the meeting); end time field 208 (e.g., which may allow user 46 to define the end time/date of the meeting); and comment field 210 (e.g., which may allow user 46 to define additional information relating to the meeting, such as dial in information; web address information; and video conference information; for example).

User 46 may select "scheduling" tab 212 using on-screen pointer 156. Once selected, and referring also to FIG. 5, calendar server application 20 and/or calendar client application 22 may render scheduling window 250, which may allow user 46 to invite one or more attendees (e.g., user 48, user 50, user 52) to the meeting being scheduled. Accordingly, by selecting "invite attendees" button 252 using on-screen pointer 156, an attendee window (not shown) may be rendered by calendar server application 20 and/or calendar client application 22. The attendee window may allow user 46 to select one or more attendees for inviting to the meeting being scheduled. For illustrative purposes, scheduling window 250 is shown to have user 46, user 48, user 50, and user 52 invited to attend the meeting.

Figure 5:
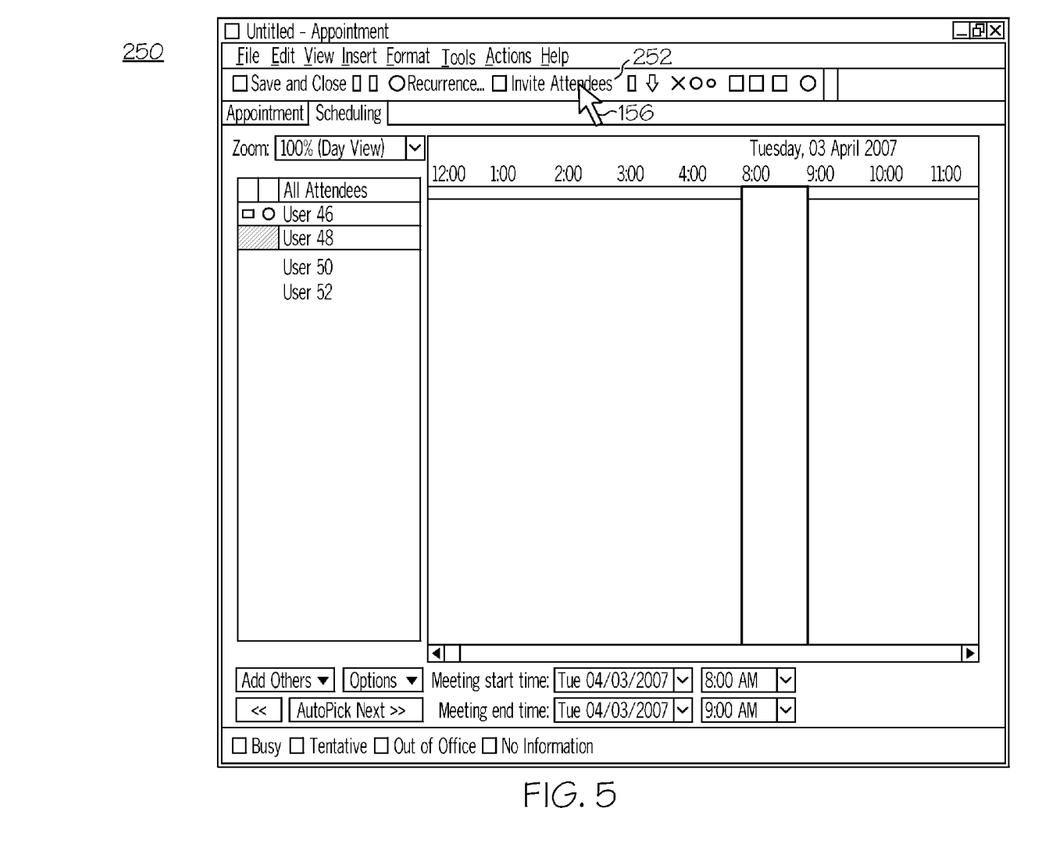
FIG. 5 is a diagrammatic view of a display screen rendered by the calendar client application and/or the calendar server application of FIG. 1.

When scheduling a meeting, the person scheduling the meeting (e.g., user 46) may be automatically designated as the "owner" of the meeting. Alternatively, meeting window 200 and/or scheduling window 200 may include an owner field (not shown) that may allow the person scheduling the meeting to designate a moderator.

Calendar management process 10 may monitor calendar server application 20 and/or calendar client application 22 and determine when meetings are being scheduled. Upon receiving an indication that a meeting has been scheduled between a plurality of attendees (in which at least one of the attendees was designated an owner of the meeting), calendar management process 10 (which may be a client-side application, a server-side application, or a hybrid client-side/server-side application) may associate ownership privileges for the meeting with at least a second one meeting attendee. Ownership privileges for the meeting may be associated with at least a second one of the meeting attendees based upon, at least in part, a social network defined for the owner of the meeting.

For example, and as discussed above, assume that user 46 (as the user that scheduled the meeting) is automatically designated as the owner of the meeting (e.g., based upon configuration settings of calendar server application 20 and/or calendar client application 22). Assume for illustrative purposes that calendar management process 10 monitors the meeting scheduling activity that occurs within calendar server application 20 and/or calendar client application 22. As such, when user 46 schedules the meeting (to which user 48, user 50, and user 52 are invited to attend), calendar management process 10 may receive an indication that the meeting is being scheduled from calendar server application 20 and/or calendar client application 22. Such indication may be automatically provided from calendar server application 20 and/or calendar client application 22 to calendar management process 10. Alternatively, calendar management process may be an applet or sub-process executed within calendar server application 20 (or within calendar client application 22) and may, therefore, proactively monitor the scheduling of meetings.

As the owner of the meeting, user 46 may have ownership privileges. Such ownership privileges may include, but are not limited to, the ability to invite attendees to the meeting (including subsequently inviting additional attendees to the meeting), removing (e.g., uninviting) attendees from the meeting, rescheduling the meeting (e.g., for a different time; to a different location; to a different format, such as from an in-person meeting to a telephone conference; etc.), and canceling the meeting. Ownership privileges may include various additional and/or alternative privileges and/or responsibilities.

Upon calendar management process 10 receiving an indication that a meeting was scheduled for 8:00-9:00 a.m. on Tuesday, 3 Apr. 2007, for which user 46 is the designated owner, calendar management process 10 may associate ownership privileges with at least a second one of the meeting attendees (e.g., user 48, user 50, user 52) based upon, at least in part, a social network defined for user 46. As discussed above, the social network for user 46 may include those individuals with whom user 46 interacts. Such interactions may include, but are not limited to, a history of communications across various communication channels (e.g., email, instant messaging, telephone, and the like), inclusion on user 46's instant messaging buddy list, attendance at the same meetings (e.g., as indicated by commonly scheduled events in respective calendaring applications), working together on the same projects, and so on. For example, user 48 and user 50 may be co-workers of user 46. As such, user 46 may regularly send and receive email and instant messages to/from users 48 and 50. Similarly, user 46 may work with users 48 and 50 on various common projects (e.g., which may be evidenced by activities of user 46, user 48, and user 50 in an online team space). Additionally, user 46 may also exchange email with user 52, and may attend meetings that user 52 is also present at. As such, each of user 48, user 50, and user 52 may be within a social network defined for user 46.

As discussed above, various policies may be implemented, e.g., regarding a proximity within the meeting owner's social network, that may, at least in part, govern the association of ownership privileges for the meeting. Absent such policies (and/or assuming that each user satisfies such policies), ownership privileges may be associated with each of user 48, user 50, and user 52 based upon, at least in part, the inclusion of user 48, user 50, and user 52 within a social network defined for user 46.

In the interest of controlling the number of users having ownership privileges, various policies, decision routines, etc., may be applied for controlling the other meeting attendees with whom ownership privileges may be associated. For example, according to one embodiment, ownership privileges may only be associated with the second meeting attendee (who may be in the social network defined for the meeting owner) if the second meeting attendee is within a predetermined proximity to the meeting owner.

The proximity of the individuals in the meeting owner's social network to the meeting owner may be based upon various factors and/or considerations. For example, relatively more frequent interaction of an individual with the meeting owner may increase the proximity between the individual and the meeting owner. Similarly, interaction over a relatively greater number of interaction mediums (e.g., email, instant messaging, common usage of a team space, etc.) may increase the proximity between the individual and the meeting owner. The foregoing, and/or other characteristics, may be employed to define ranges of relative proximity between the meeting owner and an individual in the meeting owner's social network. Additionally, the proximity of an individual to the meeting owner may wane over a period of non-interaction. That is, while initially high interaction (e.g., frequent interaction over a large number of interaction mediums) may establish a relatively close proximity to the meeting owner, the relatively close proximity may diminish during a period of time during with there is a lower degree of interaction.

Figure 6:
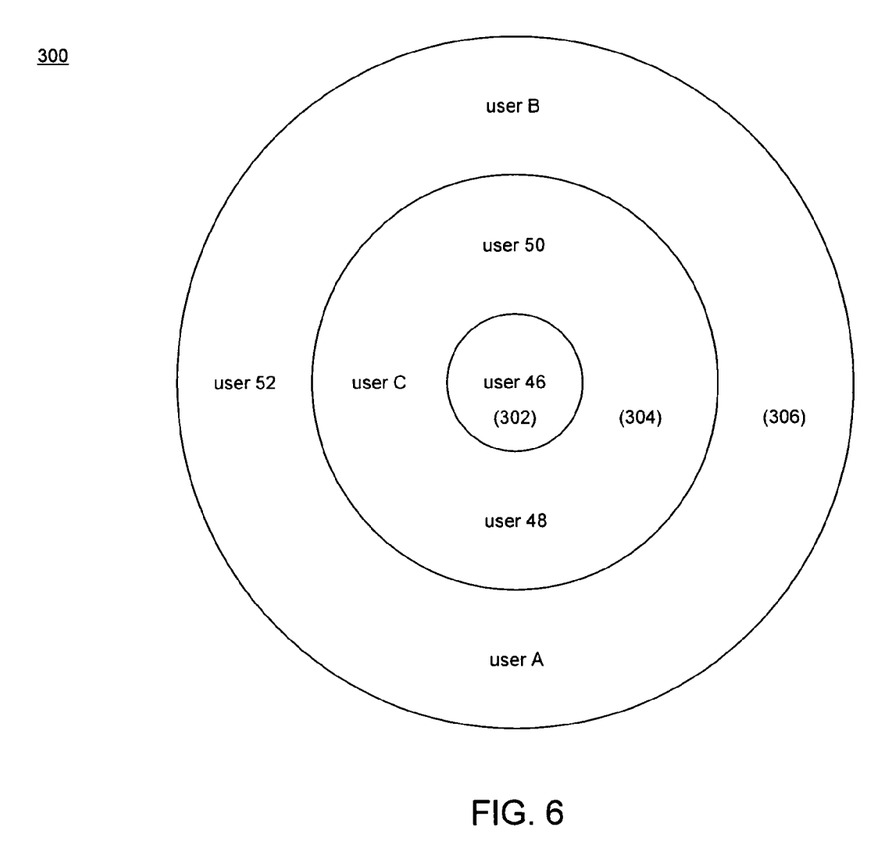
FIG. 6 diagrammatically depicts a social network of the owner of the meeting.

Referring also to FIG. 6, social network map 300 for the meeting owner (e.g., user 46) is shown, depicting the relative proximity to user 46 of individuals (e.g., user 48, user 50, user 52, user A, user B, user C) within the social network defined for user 46. As shown, social network map 300 may include proximity bands (e.g., proximity bands 302, 304, 306) indicating decreasing proximity of individuals within the social network to user 46. Social network map 300 is provided for the purposed of diagrammatically illustrating relative proximity of individuals to the meeting owner within a social network defined for the meeting owner. As such, the particular arrangement and structure of social network map 300 should not be construed as a limitation on the present disclosure, as information pertaining to the social network defined for the meeting owner and the relative proximity of individuals within the social network to the meeting owner may be organized and collected in various other ways.

Continuing with the above-example, user 46 (i.e., the meeting owner) may reside in proximity band 302 (i.e., the center of social network map 300). Proximity band 304 may include those individuals (e.g., user 48, user 50, and user C) having the closest proximity (e.g., a proximity of 1) to user 46 within the social network defined for user 46. Similarly, proximity band 306 (being further outward from proximity band 302) may include those individuals (e.g., user 52, user A, and user B) being less proximate (e.g., having a proximity of 2) to user 46 within the social network defined for user 46. Social network map 300 may include additional proximity bands (not shown), depending upon the level of granularity of proximity represented by social network map 300.

Assume, for example, ownership privileges may only be associated with the second meeting attendee (who may be in the social network defined for the meeting owner) if the second meeting attendee is within a proximity of 1 to the meeting owner. In the illustrated example, user 48, user 50, and user C (residing in proximity band 304 indicating relatively frequent and/or pervasive, etc., interaction with user 46) may have a proximity of 1 to user 46. Accordingly, in an embodiment in which ownership privileges may be associated with a second attendee based upon a social network defined for user 46, wherein the second attendee may have a predefined proximity of 1 to the meeting owner (e.g., user 46), ownership privileges may be associated with user 48 and user 50 as well as with user C.

Associating ownership privileges for the meeting with the at least a second one of the meeting attendees may include associating full ownership privileges with the at least a second one of the meeting attendees, or associating only a subset of ownership privileges with the at least a second one of the meeting attendees. For example, as discussed above, ownership privileges may include, but are not limited to, the ability to invite attendees to the meeting (including subsequently inviting additional attendees to the meeting), removing (e.g., uninviting) attendees from the meeting, rescheduling the meeting (e.g., for a different time; to a different location; to a different format, such as from an in-person meeting to a telephone conference; etc.), and canceling the meeting, as well as various additional and/or alternative privileges with respect to the meeting. Associating ownership privileges may include associating all ownership privileges (e.g., a full delegation) or associating only a portion of the privileges (e.g., a partial or restricted delegation). The number and/or extent of ownership privileges associated with the at least a second meeting attendee may be, for example, determined on a systemic level and/or may be determined by the meeting owner (e.g., user 46) at the time the meeting is scheduled.

Associating ownership privileges for the meeting with the at least a second one of the meeting attendees may include enabling the at least a second one of the meeting attendees to cancel the meeting. Assume for illustrative purposes that calendar management process 10 associates ownership privileges with user 48. As such, calendar management process 10 may enable user 48 to cancel the meeting. Rather than requesting that user 46, as the designated owner of the meeting, cancel the meeting, calendar management process 10 may enable user 48 to cancel (e.g., via a calendar visual interface; not shown) the meeting himself.

Associating ownership privileges for the meeting with the at least a second one of the meeting attendees may include enabling the at least a second one of the meeting attendees to reschedule the meeting. Continuing with the above-stated example, rather than wishing to outright cancel the meeting, user 48 may decide that, in view of the absent essential attendees, the meeting should be postponed until everyone is able to attend. As discussed above, coordinating the postponement of the meeting with user 46, as the designated owner of the meeting, may introduce additional problems or complications. Having associated ownership privileges with user 48, calendar management process 10 may enable user 48 to reschedule (e.g., via a calendar visual interface, meeting window, or the like similar to those described above; not shown) the meeting for a later date, e.g., later in the week when all of the necessary attendees are expected to be available.

Furthermore, associating ownership privileges for the meeting with the at least a second one of the meeting attendees may include enabling the at least a second one of the meeting attendees to add one or more additional meeting attendees. Continuing further with the above-stated example, when user 48 accesses, e.g., a calendar visual interface, to reschedule the meeting, user 48 may realize that only a portion of the department has been invited to the meeting. Deeming the attendance of the entire department to be necessary for optimum productivity of the meeting, user 48 may wish to invite one or more additional users from the department (e.g., user A, user B, user C). Again, rather than accruing the additional administrative overhead of coordinating the addition of user A, user B, and user C to the meeting, calendar management process 10 may enable user 48 to invite (e.g., via a calendar visual interface, meeting window, or the like; not shown) user A, user B, and user C to the meeting.

Associating ownership privileges for the meeting with the at least a second one of the meeting attendees may include enabling the at least a second one of the meeting attendees to remove one or more of the plurality of attendees. Still continuing with the above-described example, in addition to realizing that members of the department were not invited to the meeting, user 48 may realize that user 52, the director of the finance department of Company X, was invited to the meeting even though the topic of the meeting relates to development progress of a new software product. Having realized that user 52 is not necessary for the meeting, calendar management process 10 may enable user 48 to remove (e.g., via a calendar visual interface, meeting window, or the like; not shown) user 52 from the meeting.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method, comprising:
   receiving an indication of a meeting being scheduled between a plurality of attendees, wherein a first one of the attendees is designated an owner of the meeting;
   determining a social network for the owner of the meeting, the social network including individuals with whom the owner of meeting interacts with across a plurality of communication channels;
   identifying at least a second one of the meeting attendees, wherein at least the second one of the meeting attendees is part of the social network;
   determining that at least the second one of the meeting attendees has a predefined threshold level of proximity to the owner of the meeting within the social network, wherein proximity is based upon, at least in part, how often at least the second one of the meeting attendees interacts with the meeting owner, wherein the proximity is increased when there are more frequent interactions between the owner and the at least the second one of the meeting attendees and diminished during a period of time when there is a lower degree of said interactions;
   associating ownership privileges for the meeting with at least the second one of the meeting attendees based upon, at least in part, the second one of the meeting attendees having the predefined threshold level of proximity to the owner of the meeting within the social network; and
   allowing the second one of the meeting attendees to exercise the ownership privileges for the meeting.

2. The method of claim 1, wherein associating ownership privileges for the meeting with the second one of the meeting attendees includes one or more of enabling the second one of the meeting attendees to cancel the meeting and enabling the second one of the meeting attendees to reschedule the meeting.

3. The method of claim 1, wherein associating ownership privileges for the meeting with the second one of the meeting attendees includes at least one of:
   enabling the second one of the meeting attendees to add at least one additional meeting attendee; and
   enabling the second one of the meeting attendees to remove at least one of the plurality of attendees.

4. The method of claim 1, wherein the predefined threshold level of proximity to the owner of the meeting within the social network is defined for the owner of the meeting.

5. The method of claim 4, wherein the predefined threshold level of proximity to the owner of the meeting within the social network is based upon, at least in part, a social network map.

6. The method of claim 1, wherein how often at least the second one of the meeting attendees interacts with the meeting owner is based include, at least in part, a history of communications across one or more communication channels.

7. The method of claim 1, wherein the social networking application that defines, at least in part, the social network defined for the owner of the meeting includes IBM Lotus Connections.

8. The method of claim 1, wherein the social networking application that defines, at least in part, the social network defined for the owner of the meeting includes at least one of: SharePoint, Facebook, LinkedIn, MySpace, and Twitter.

9. The method of claim 1, wherein how often at least the second one of the meeting attendees interacts with the meeting owner is determined based upon, at least in part, one or more of the inclusion of the second one of the attendees on a contact list associated with the meeting owner and an activity history associated with at least one of the meeting owner and the second one of the attendees.

10. A computer program product comprising a non-transitory computer readable medium having a plurality of instructions stored thereon, which, when executed by a processor, cause the processor to perform operations comprising:
   receiving an indication of a meeting being scheduled between a plurality of attendees, wherein a first one of the attendees is designated an owner of the meeting;
   determining a social network for the owner of the meeting, the social network including individuals with whom the owner of meeting interacts with across a plurality of communication channels;
   identifying at least a second one of the meeting attendees, wherein at least the second one of the meeting attendees is part of the social network;
   determining that at least the second one of the meeting attendees has a predefined threshold level of proximity to the owner of the meeting within the social network, wherein proximity is based upon, at least in part, how often at least the second one of the meeting attendees interacts with the meeting owner, wherein the proximity is increased when there are more frequent interactions between the owner and the at least the second one of the meeting attendees and diminished during a period of time when there is a lower degree of said interaction;

associating ownership privileges for the meeting with at least the second one of the meeting attendees based upon, at least in part, the second one of the meeting attendees having the predefined threshold level of proximity to the owner of the meeting within the social network; and allowing the second one of the meeting attendees to exercise the ownership privileges for the meeting.

11. The computer program product of claim 10, wherein the instructions for associating ownership privileges for the meeting with the second one of the meeting attendees include instructions for one or more of enabling the second one of the meeting attendees to cancel the meeting and enabling the second one of the meeting attendees to reschedule the meeting.

12. The computer program product of claim 10, wherein the instructions for associating ownership privileges for the meeting with the second one of the meeting attendees include instructions at least one of:

enabling the second one of the meeting attendees to add at least one additional meeting attendee; and enabling the second one of the meeting attendees to remove at least one of the plurality of attendees.

13. The computer program product of claim 10, wherein the predefined threshold level of proximity to the owner of the meeting within the social network is defined for the owner of the meeting.

14. The computer program product of claim 10, wherein how often at least the second one of the meeting attendees interacts with the meeting owner is determined based upon, at least in part, one or more of the inclusion of the second one of the attendees on a contact list associated with the meeting owner and an activity history associated with at least one of the meeting owner and the second one of the attendees.

15. A computing system comprising:

at least one processor;

at least one memory architecture coupled with the at least one processor;

a first software module executed on the at least one processor and using the at least one memory architecture, wherein the first software module is configured to receive an indication of a meeting being scheduled between a plurality of attendees, wherein a first one of the attendees is designated an owner of the meeting;

a second software module executed on the at least one processor and using the at least one memory architecture, wherein the second software module is configured to determine a social network for the owner of the meeting, the social network including individuals with whom the owner of meeting interacts with across a plurality of communication channels;

a third software module executed on the at least one processor and using the at least one memory architecture, wherein the second software module is configured to identify at least a second one of the meeting attendees, wherein at least the second one of the meeting attendees is part of the social network; and a fourth software module executed on the at least one processor and using the at least one memory architecture, wherein the second software module is configured to determine that at least the second one of the meeting attendees has a predefined threshold level of proximity to the owner of the meeting within the social network, wherein proximity is based upon, at least in part, how often at least the second one of the meeting attendees interacts with the meeting owner, wherein the proximity is increased when there are more frequent interactions between the owner and the at least the second one of the meeting attendees and diminished during a period of time when there is a lower degree of said interaction, the fourth software module further configured to associate ownership privileges for the meeting with at least the second one of the meeting attendees based upon, at least in part, the second one of the meeting attendees having the predefined threshold level of proximity to the owner of the meeting within the social network, the fourth software module further configured to allow the second one of the meeting attendees to exercise the ownership privileges for the meeting.

16. The computing system of claim 15, wherein the second software module, which is configured to associate ownership privileges for the meeting with the second one of the meeting attendees, is further configured to one or more of enable the second one of the meeting attendees to cancel the meeting and enable the second one of the meeting attendees to reschedule the meeting.

17. The computing system of claim 15, wherein the second software module, which is configured to associate ownership privileges for the meeting with the second one of the meeting attendees, is further configured to at least one of:

enable the second one of the meeting attendees to add at least one additional meeting attendee; and enable the second one of the meeting attendees to remove at least one of the plurality of attendees.

18. The computing system of claim 15, wherein the predefined threshold level of proximity to the owner of the meeting within the social network is defined for the owner of the meeting.

19. The computer system of claim 15, wherein how often at least the second one of the meeting attendees interacts with the meeting owner is determined based upon, at least in part, one or more of the inclusion of the second one of the attendees on a contact list associated with the meeting owner and an activity history associated with at least one of the meeting owner and the second one of the attendees.

* * * * *

UNITED STATES PATENT AND TRADEMARK OFFICE
CERTIFICATE OF CORRECTION

PATENT NO. : 9,536,230 B2
APPLICATION NO. : 12/346045
DATED : January 3, 2017
INVENTOR(S) : Liam Harpur et al.

Page 1 of 1

It is certified that error appears in the above-identified patent and that said Letters Patent is hereby corrected as shown below:

On the Title Page

Item (75) should be corrected to read as follows:

Liam Harpur, Skerries (IE), Patrick Joseph O'Sullivan, Ballsbridge (IE), Fred Raguillat, Dunboyne (IE), Daniel Terlizzi, Arezzo (IT), Carol Sue Zimmet, Boxborough, MA (US)

Signed and Sealed this
Twenty-seventh Day of February, 2018

Andrei Iancu
*Director of the United States Patent and Trademark Office*